United States Patent
Hardman et al.

(10) Patent No.: US 12,497,517 B1
(45) Date of Patent: *Dec. 16, 2025

(54) METHOD OF MAKING CARBON BLACK

(71) Applicant: Monolith Materials, Inc., Lincoln, NE (US)

(72) Inventors: Ned J. Hardman, Lincoln, NE (US); Roscoe W. Taylor, Kingwood, TX (US)

(73) Assignee: Monolith Materials, Inc., Lincoln, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/778,707

(22) Filed: Jul. 19, 2024

Related U.S. Application Data

(63) Continuation of application No. 15/229,608, filed on Aug. 5, 2016.

(60) Provisional application No. 62/202,498, filed on Aug. 7, 2015.

(51) Int. Cl.
 C09C 1/48 (2006.01)
 C01B 32/05 (2017.01)

(52) U.S. Cl.
 CPC ............... *C09C 1/48* (2013.01); *C01B 32/05* (2017.08)

(58) Field of Classification Search
 CPC .................................. C01B 32/05; C09C 1/48
 See application file for complete search history.

(56) References Cited

U.S. PATENT DOCUMENTS

| | | |
|---|---|---|
| 709,868 A | 9/1902 | Bradley et al. |
| 1,339,225 A | 5/1920 | Rose |
| 1,536,612 A | 5/1925 | Lewis |
| 1,597,277 A | 8/1926 | Jakowsky |
| 1,931,800 A | 10/1933 | Jakosky et al. |
| 2,002,003 A | 5/1935 | Otto et al. |
| 2,039,312 A | 5/1936 | Goldman |
| 2,062,358 A | 12/1936 | Frolich |
| 2,393,106 A | 1/1946 | Bernard et al. |
| 2,557,143 A | 6/1951 | Royster |
| 2,572,851 A | 10/1951 | Daniel et al. |
| 2,603,669 A | 7/1952 | Chappell |
| 2,603,699 A | 7/1952 | Roper |
| 2,616,842 A | 11/1952 | Charles et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,897,869 A | 8/1959 | Polmanteer |
| 2,951,143 A | 8/1960 | Anderson et al. |
| 3,009,783 A | 11/1961 | Charles et al. |
| 3,073,769 A | 1/1963 | George et al. |
| 3,127,536 A | 3/1964 | Mclane |
| 3,253,890 A | 5/1966 | De Land et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. et al. |
| 3,408,164 A | 10/1968 | Johnson |
| 3,409,403 A | 11/1968 | Geir et al. |
| 3,420,632 A | 1/1969 | Ryan et al. |
| 3,431,074 A | 3/1969 | Jordan et al. |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho et al. |
| 3,725,103 A | 4/1973 | Jordan et al. |
| 3,793,438 A | 2/1974 | Gunnell et al. |
| 3,852,399 A | 12/1974 | Rothbuhr et al. |
| 3,922,335 A | 11/1975 | Jordan et al. |
| 3,959,008 A | 5/1976 | Warner et al. |
| 3,981,654 A | 9/1976 | Rood et al. |
| 3,981,659 A | 9/1976 | Myers |
| 3,984,743 A | 10/1976 | Horie |
| 3,998,934 A | 12/1976 | Vanderveen |
| 4,019,896 A | 4/1977 | Appleby |
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,088,741 A | 5/1978 | Takewell |
| 4,101,639 A | 7/1978 | Surovikin et al. |
| 4,138,471 A | 2/1979 | Lamond et al. |
| 4,199,545 A | 4/1980 | Matovich |
| 4,217,132 A | 8/1980 | Burge et al. |
| 4,258,770 A | 3/1981 | Davis et al. |
| 4,282,199 A | 8/1981 | Lamond et al. |
| 4,289,949 A | 9/1981 | Raaness et al. |
| 4,292,291 A | 9/1981 | Rothbuhr et al. |

(Continued)

FOREIGN PATENT DOCUMENTS

| | | | |
|---|---|---|---|
| AU | 2897071 A | 11/1972 | |
| BG | 98848 A | 5/1995 | |

(Continued)

OTHER PUBLICATIONS

AP-42, Fifth Edition, vol. 1, Chapter 6: Organic Chemical Process Industry, Section 6.1: Carbon Black (1983): 1-10.

(Continued)

*Primary Examiner* — Stuart L Hendrickson
(74) *Attorney, Agent, or Firm* — Osha Bergman Watanabe & Burton LLP

(57) ABSTRACT

A method of making tailored carbon black in a plasma process. A method of making tailored carbon black in a plasma process is described, including subjecting the carbon black particles during and/or after formation to surface functionalizing agents in a controlled manner so as to impart a degree and/or density of functionalization onto the carbon black particles so as to adapt the particles to a particular pre-intended application.

13 Claims, No Drawings

(56) References Cited

U.S. PATENT DOCUMENTS

| | | | |
|---|---|---|---|
| 4,317,001 A | 2/1982 | Silver et al. |
| 4,372,937 A | 2/1983 | Johnson |
| 4,404,178 A | 9/1983 | Johnson et al. |
| 4,431,624 A | 2/1984 | Casperson |
| 4,452,771 A | 6/1984 | Hunt |
| 4,460,558 A | 7/1984 | Johnson |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,594,381 A | 6/1986 | Davis |
| 4,597,776 A | 7/1986 | Ullman et al. |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,766,287 A | 8/1988 | Morrisroe et al. |
| 4,787,320 A | 11/1988 | Raaness et al. |
| 4,797,262 A | 1/1989 | Dewitz |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,126,501 A | 6/1992 | Ellul |
| 5,138,959 A | 8/1992 | Kulkarni |
| 5,147,998 A | 9/1992 | Tsantrizos et al. |
| 5,159,009 A | 10/1992 | Wolff et al. |
| 5,206,880 A | 4/1993 | Olsson |
| 5,222,448 A | 6/1993 | Morgenthaler et al. |
| 5,352,289 A | 10/1994 | Weaver et al. |
| 5,399,957 A | 3/1995 | Vierboom |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A * | 6/1996 | Lynum .................. C09C 1/487 423/449.1 |
| 5,578,647 A | 11/1996 | Li et al. |
| 5,593,644 A | 1/1997 | Norman et al. |
| 5,602,298 A | 2/1997 | Levin |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,042,643 A | 3/2000 | Belmont et al. |
| 6,058,133 A | 5/2000 | Bowman et al. |
| 6,068,827 A | 5/2000 | Lynum et al. |
| 6,090,880 A | 7/2000 | Zimmer et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,471,937 B1 | 10/2002 | Anderson et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,485,280 B2 | 2/2009 | Matsuki et al. |
| 7,563,525 B2 | 7/2009 | Ennis |
| 7,576,296 B2 | 8/2009 | Fincke et al. |
| 7,582,184 B2 | 9/2009 | Tomita et al. |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,847,009 B2 | 12/2010 | Wong et al. |
| 7,931,712 B2 | 4/2011 | Zubrin et al. |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,475,551 B2 | 7/2013 | Tsangaris et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 8,945,434 B2 | 2/2015 | Krause et al. |
| 9,023,928 B2 | 5/2015 | Miyazaki et al. |
| 9,095,835 B2 | 8/2015 | Skoptsov et al. |
| 9,229,396 B1 | 1/2016 | Wu et al. |
| 9,315,735 B2 | 4/2016 | Cole et al. |
| 9,388,300 B2 | 7/2016 | Dikan et al. |
| 9,445,488 B2 | 9/2016 | Foret |
| 9,574,086 B2 | 2/2017 | Johnson et al. |
| 9,679,750 B2 | 6/2017 | Choi et al. |
| 9,812,295 B1 | 11/2017 | Stowell |
| 10,100,200 B2 | 10/2018 | Johnson et al. |
| 10,138,378 B2 | 11/2018 | Hoermman et al. |
| 10,370,539 B2 | 8/2019 | Johnson et al. |
| 10,519,299 B2 | 12/2019 | Sevignon et al. |
| 10,618,026 B2 | 4/2020 | Taylor et al. |
| 10,808,097 B2 | 10/2020 | Hardman et al. |
| 11,149,148 B2 | 10/2021 | Taylor et al. |
| 11,203,692 B2 | 12/2021 | Hoermann et al. |
| 11,263,217 B2 | 3/2022 | Zimovnov et al. |
| 11,304,288 B2 | 4/2022 | Hoermann et al. |
| 11,453,784 B2 | 9/2022 | Hardman et al. |
| 11,492,496 B2 | 11/2022 | Hoermann et al. |
| 11,591,477 B2 | 2/2023 | Johnson et al. |
| 11,665,808 B2 | 5/2023 | Moss et al. |
| 11,760,884 B2 | 9/2023 | Hardman et al. |
| 11,866,589 B2 | 1/2024 | Johnson et al. |
| 11,926,743 B2 | 3/2024 | Johnson et al. |
| 11,939,477 B2 | 3/2024 | Johnson et al. |
| 11,987,712 B2 | 5/2024 | Hardman et al. |
| 11,998,886 B2 | 6/2024 | Taylor et al. |
| 12,012,515 B2 | 6/2024 | Hoermann et al. |
| 12,030,776 B2 | 7/2024 | Hardman |
| 12,119,133 B2 | 10/2024 | Hardman et al. |
| 12,144,099 B2 | 11/2024 | Hoermann et al. |
| 12,250,764 B2 | 3/2025 | Moss et al. |
| 2001/0029888 A1 | 10/2001 | Sundarrajan et al. |
| 2001/0039797 A1 | 11/2001 | Cheng |
| 2002/0000085 A1 | 1/2002 | Hall et al. |
| 2002/0021430 A1 | 2/2002 | Koshelev et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0136661 A1 | 7/2003 | Kong et al. |

(56) References Cited

U.S. PATENT DOCUMENTS

| | | |
|---|---|---|
| 2003/0152184 A1 | 8/2003 | Shehane et al. |
| 2004/0001626 A1 | 1/2004 | Baudry et al. |
| 2004/0045808 A1 | 3/2004 | Fabry et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0228290 A1 | 10/2006 | Green |
| 2006/0239890 A1 | 10/2006 | Chang et al. |
| 2007/0010606 A1 | 1/2007 | Hergenrother et al. |
| 2007/0104636 A1 | 5/2007 | Kutsovsky et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0263954 A1 | 10/2008 | Hammel et al. |
| 2008/0279749 A1 | 11/2008 | Probst et al. |
| 2008/0286574 A1 | 11/2008 | Hamby et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0151844 A1 | 6/2009 | Miyazaki |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0055017 A1 | 3/2010 | Vanier et al. |
| 2010/0147188 A1 | 6/2010 | Mamak et al. |
| 2010/0249353 A1 | 9/2010 | MacIntosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0089115 A1 | 4/2011 | Lu |
| 2011/0120137 A1 | 5/2011 | Ennis |
| 2011/0138766 A1 | 6/2011 | Elkady et al. |
| 2011/0150756 A1 | 6/2011 | Adams et al. |
| 2011/0155703 A1 | 6/2011 | Winn |
| 2011/0174407 A1 | 7/2011 | Lundberg et al. |
| 2011/0180513 A1 | 7/2011 | Luhrs et al. |
| 2011/0214425 A1 | 9/2011 | Lang et al. |
| 2011/0217229 A1 | 9/2011 | Inomata et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0092598 A1* | 4/2012 | Kyrlidis ............... C09B 68/463 546/37 |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0126485 A1 | 5/2013 | Foret |
| 2013/0187098 A1 | 7/2013 | Mathew et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0013996 A1 | 1/2014 | Dikan et al. |
| 2014/0027411 A1 | 1/2014 | Voronin et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Baker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0296413 A1 | 10/2014 | Miyazaki et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056127 A1 | 2/2015 | Chavan et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0183962 A1* | 7/2015 | Belmont ............... C09C 1/48 524/105 |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0259211 A9 | 9/2015 | Hung et al. |
| 2015/0307351 A1 | 10/2015 | Mabrouk et al. |
| 2016/0030856 A1 | 2/2016 | Kaplan et al. |
| 2016/0152469 A1 | 6/2016 | Chakravarti et al. |
| 2016/0210856 A1 | 7/2016 | Assenbaum et al. |
| 2016/0243518 A1 | 8/2016 | Spitzl |
| 2016/0293959 A1 | 10/2016 | Blizanac et al. |
| 2016/0296905 A1 | 10/2016 | Kuhl |
| 2016/0319110 A1 | 11/2016 | Matheu et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0117538 A1 | 4/2017 | Bendimerad et al. |
| 2017/0349758 A1 | 12/2017 | Johnson et al. |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0148506 A1 | 5/2018 | Png et al. |
| 2018/0340074 A1 | 11/2018 | Wittmann et al. |
| 2018/0366734 A1 | 12/2018 | Korchev et al. |
| 2019/0040225 A1 | 2/2019 | Tassinari et al. |
| 2019/0048200 A1 | 2/2019 | Johnson et al. |
| 2019/0100658 A1 | 4/2019 | Taylor et al. |
| 2019/0153234 A1 | 5/2019 | Hoermann et al. |
| 2019/0232718 A1 | 8/2019 | Halasa et al. |
| 2019/0338139 A1 | 11/2019 | Hoermann et al. |
| 2020/0140691 A1 | 5/2020 | Johnson et al. |
| 2020/0239697 A1 | 7/2020 | Wittmann et al. |

(56) References Cited

U.S. PATENT DOCUMENTS

| | | |
|---|---|---|
| 2020/0291237 A1 | 9/2020 | Hardman et al. |
| 2021/0017025 A1 | 1/2021 | Hardman |
| 2021/0017031 A1 | 1/2021 | Hardman et al. |
| 2021/0020947 A1 | 1/2021 | Hardman et al. |
| 2021/0071007 A1 | 3/2021 | Hardman et al. |
| 2021/0120658 A1 | 4/2021 | Moss et al. |
| 2021/0261417 A1 | 8/2021 | Cardinal et al. |
| 2022/0119626 A1 | 4/2022 | Kitago et al. |
| 2022/0251333 A1 | 8/2022 | Zhang et al. |
| 2022/0272826 A1 | 8/2022 | Hoermann et al. |
| 2022/0274046 A1 | 9/2022 | Johnson et al. |
| 2022/0339595 A1 | 10/2022 | Taylor et al. |
| 2023/0136364 A1 | 5/2023 | Johnson et al. |
| 2023/0154640 A1 | 5/2023 | Hardman et al. |
| 2023/0212401 A1 | 7/2023 | Hardman et al. |
| 2023/0257260 A1 | 8/2023 | Kacem et al. |
| 2023/0279234 A1 | 9/2023 | Hoermann et al. |
| 2023/0279235 A1 | 9/2023 | Taylor et al. |
| 2023/0354501 A1 | 11/2023 | Moss et al. |
| 2023/0357021 A1 | 11/2023 | Hanson et al. |
| 2024/0093035 A1 | 3/2024 | Hardman et al. |
| 2024/0343909 A1 | 10/2024 | Johnson et al. |
| 2024/0343910 A1 | 10/2024 | Hardman et al. |
| 2024/0409720 A1 | 12/2024 | Hardman et al. |
| 2025/0066189 A1 | 2/2025 | Leis et al. |

FOREIGN PATENT DOCUMENTS

| | | |
|---|---|---|
| CA | 830378 A | 12/1969 |
| CA | 964405 A | 3/1975 |
| CA | 2353752 A1 | 1/2003 |
| CA | 2621749 A1 | 8/2009 |
| CA | 3060482 A1 | 11/2017 |
| CN | 85201622 U | 7/1986 |
| CN | 86104761 A | 2/1987 |
| CN | 85109166 A | 4/1987 |
| CN | 1059541 A | 3/1992 |
| CN | 1076206 A | 9/1993 |
| CN | 1077329 A | 10/1993 |
| CN | 1078727 A | 11/1993 |
| CN | 1082571 A | 2/1994 |
| CN | 1086527 A | 5/1994 |
| CN | 1196032 A | 10/1998 |
| CN | 1398780 A | 2/2003 |
| CN | 1458966 A | 11/2003 |
| CN | 1491740 A | 4/2004 |
| CN | 1644650 A | 7/2005 |
| CN | 1656632 A | 8/2005 |
| CN | 1825531 A | 8/2006 |
| CN | 1833313 A | 9/2006 |
| CN | 101092691 A | 12/2007 |
| CN | 101143296 A | 3/2008 |
| CN | 101193817 A | 6/2008 |
| CN | 101198442 A | 6/2008 |
| CN | 201087175 Y | 7/2008 |
| CN | 201143494 Y | 11/2008 |
| CN | 101335343 A | 12/2008 |
| CN | 101368010 A | 2/2009 |
| CN | 101529606 A | 9/2009 |
| CN | 101534930 A | 9/2009 |
| CN | 101657283 A | 2/2010 |
| CN | 101734620 A | 6/2010 |
| CN | 101946080 A | 1/2011 |
| CN | 101958221 A | 1/2011 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 102702801 A | 10/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 104798228 A | 7/2015 |
| CN | 105070518 A | 11/2015 |
| CN | 105073906 A | 11/2015 |
| CN | 105308775 A | 2/2016 |
| CN | 205472672 U | 8/2016 |
| CN | 107709474 A | 2/2018 |
| DE | 211457 A3 | 7/1984 |
| DE | 19807224 A1 | 8/1999 |
| EA | 200300389 A1 | 12/2003 |
| EP | 0315442 A2 | 5/1989 |
| EP | 0325689 A1 | 8/1989 |
| EP | 0616600 A1 | 9/1994 |
| EP | 0635044 B1 | 2/1996 |
| EP | 0635043 B1 | 6/1996 |
| EP | 0861300 A1 | 9/1998 |
| EP | 0982378 A1 | 3/2000 |
| EP | 1017622 A1 | 7/2000 |
| EP | 1088854 A2 | 4/2001 |
| EP | 1188801 A1 | 3/2002 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| EP | 4225698 A1 | 8/2023 |
| FR | 1249094 A | 12/1960 |
| FR | 2891434 A1 | 3/2007 |
| FR | 2937029 A1 | 4/2010 |
| FR | 3112767 B1 | 5/2023 |
| GB | 395893 A | 7/1933 |
| GB | 987498 A | 3/1965 |
| GB | 1068519 | 5/1967 |
| GB | 1068519 A | 5/1967 |
| GB | 1291487 A | 10/1972 |
| GB | 1400266 A | 7/1975 |
| GB | 1492346 A | 11/1977 |
| GB | 2419883 A | 5/2006 |
| JP | S5021983 B1 | 7/1975 |
| JP | S5987800 A | 5/1984 |
| JP | S6411074 A | 1/1989 |
| JP | H04228270 A | 8/1992 |
| JP | H05226096 A | 9/1993 |
| JP | H06302527 A | 10/1994 |
| JP | H06322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | H09316645 A | 12/1997 |
| JP | H11123562 A | 5/1999 |
| JP | 2001085014 A | 3/2001 |
| JP | 2001164053 A | 6/2001 |
| JP | 2001253974 A | 9/2001 |
| JP | 2002121422 A | 4/2002 |
| JP | 2002203551 A | 7/2002 |
| JP | 2004300334 A | 10/2004 |
| JP | 3636623 B2 | 4/2005 |
| JP | 2005235709 A | 9/2005 |
| JP | 2005243410 A | 9/2005 |
| JP | 2007505975 A | 3/2007 |
| JP | 2010525142 A | 7/2010 |

(56) References Cited

FOREIGN PATENT DOCUMENTS

| | | |
|---|---|---|
| JP | 2012505939 A | 3/2012 |
| JP | 5226096 B2 | 7/2013 |
| JP | 2016526257 A | 9/2016 |
| KR | 19980703132 A | 10/1998 |
| KR | 20030046455 A | 6/2003 |
| KR | 20050053595 A | 6/2005 |
| KR | 20080105344 A | 12/2008 |
| KR | 20140022263 A | 2/2014 |
| KR | 20140075261 A | 6/2014 |
| KR | 20150121142 A | 10/2015 |
| KR | 20170031061 A | 3/2017 |
| RU | 2425795 C2 | 8/2011 |
| RU | 2488984 C2 | 7/2013 |
| TW | 200418933 A | 10/2004 |
| WO | WO-9004852 A1 | 5/1990 |
| WO | WO-9204415 A1 | 3/1992 |
| WO | WO-9312030 A1 | 6/1993 |
| WO | WO-9312031 A1 | 6/1993 |
| WO | WO-9312633 A1 | 6/1993 |
| WO | WO-9318094 A1 | 9/1993 |
| WO | WO-9320152 A1 | 10/1993 |
| WO | WO-9320153 A1 | 10/1993 |
| WO | WO-9323331 A1 | 11/1993 |
| WO | WO-9408747 A1 | 4/1994 |
| WO | WO-9618688 A1 | 6/1996 |
| WO | WO-9629710 A1 | 9/1996 |
| WO | WO-9703133 A1 | 1/1997 |
| WO | WO-9813428 A1 | 4/1998 |
| WO | WO-0018682 A1 | 4/2000 |
| WO | WO-0192151 A1 | 12/2001 |
| WO | WO-0224819 A1 | 3/2002 |
| WO | WO-03014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | WO-2012015313 A1 | 2/2012 |
| WO | WO-2012067546 A2 | 5/2012 |
| WO | WO-2012094743 A1 | 7/2012 |
| WO | WO-2012149170 A1 | 11/2012 |
| WO | WO-2013134093 A1 | 9/2013 |
| WO | WO-2013184074 A1 | 12/2013 |
| WO | WO-2013185219 A1 | 12/2013 |
| WO | WO-2014000108 A1 | 1/2014 |
| WO | WO-2014012169 A1 | 1/2014 |
| WO | WO-2014149455 A1 | 9/2014 |
| WO | WO-2015049008 A1 | 4/2015 |
| WO | WO-2015051893 A1 | 4/2015 |
| WO | WO-2015051898 A1 | 4/2015 |
| WO | WO-2015093947 A1 | 6/2015 |
| WO | WO-2015116797 A1 | 8/2015 |
| WO | WO-2015116798 A1 | 8/2015 |
| WO | WO-2015116800 A1 | 8/2015 |
| WO | WO-2015116807 A1 | 8/2015 |
| WO | WO-2015116811 A1 | 8/2015 |
| WO | WO-2015116943 A2 | 8/2015 |
| WO | WO-2015129683 A1 | 9/2015 |
| WO | WO-2016012367 A1 | 1/2016 |
| WO | WO-2016014641 A1 | 1/2016 |
| WO | WO-2016126598 A1 | 8/2016 |
| WO | WO-2016126599 A1 | 8/2016 |
| WO | WO-2016126600 A1 | 8/2016 |
| WO | WO-2017019683 A1 | 2/2017 |
| WO | WO-2017027385 A1 | 2/2017 |
| WO | WO-2017034980 A1 | 3/2017 |
| WO | WO-2017044594 A1 | 3/2017 |
| WO | WO-2017048621 A1 | 3/2017 |
| WO | WO-2017190015 A1 | 11/2017 |
| WO | WO-2017190045 A1 | 11/2017 |
| WO | WO-2018165483 A1 | 9/2018 |
| WO | WO-2018195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |
| WO | WO-2022076306 | 4/2022 |
| WO | WO-2023059520 | 4/2023 |
| WO | WO-2023137120 A1 | 7/2023 |
| WO | WO-2023235486 A1 | 12/2023 |
| WO | WO-2024086782 | 4/2024 |
| WO | WO-2024086831 | 4/2024 |
| WO | WO-2024254343 A2 | 12/2024 |

OTHER PUBLICATIONS

ASTM International Designation: D6556-14. Standard Test Method for Carbon Black—Total and External Surface Area by Nitrogen Adsorption1, 2014. 5 Pages.

ASTM International: Standard Test Method for Carbon Black—Morphological Characterization of Carbon Black Using Electron Microscopy, D3849-07 (2011); 7 Pages.

Ayala, et al., Carbon Black Elastomer Interaction. Rubber Chemistry and Technology (1991): 19-39.

Bakken, et al., Thermal plasma process development in Norway. Pure and Applied Chemistry 70.6 (1998): 1223-1228.

Biscoe, et al., An X-ray study of carbon black. Journal of Applied physics, 1942; 13: 364-371.

Boehm, Some Aspects of Surface Chemistry of Carbon Blacks and Other Carbons. Carbon. 32.5. (1994): 759-769.

Breeze, Raising steam plant efficiency-Pushing the steam cycle boundaries.PEI Magazine 20.4 (2012) 1-12.

Carmer, et al., Formation of silicon carbide particles behind shock waves. Appl. Phys. Lett. 54(15), Apr. 10, 1989. 1430-1432.

Cataldo, The impact of a fullerene-like concept in carbon black science. Carbon 40 (2002): 157-162.

Chiesa, Paolo, et al., Using Hydrogen as Gas Turbine Fuel. Journal of Engineering for Gas Turbines and Power 127(1):73-80 (2005).

Cho, et al., Conversion of natural gas to hydrogen and carbon black by plasma and application of plasma black. Symposia—American Chemical Society, Div. Fuel Chem. 49.1. (2004): 181-183.

Chuang, S.H. et al. Hot flow analysis of swirling sudden-expansion dump combustor. Int. J. Numer. Meth. Fluids, 14: 217-239 (1992). https://doi.org/10.1002/fld.1650140208.

Co-pending U.S. Appl. No. 16/807,550, inventors Taylor; Roscoe W. et al., filed Mar. 3, 2020.

Co-pending U.S. Appl. No. 17/021,197, inventors Hardman; Ned J. et al., filed Sep. 15, 2020.

Co-pending U.S. Appl. No. 17/031,484, inventors Johnson; Peter L. et al., filed Sep. 24, 2020.

Co-pending U.S. Appl. No. 17/072,416, inventors Taylor; Roscoe W. et al., filed Oct. 16, 2020.

Co-pending U.S. Appl. No. 17/239,041, inventors Hardmanned; J. et al., filed Apr. 23, 2021.

Co-pending U.S. Appl. No. 17/245,296, inventors Johnsonpeter; L. et al., filed Apr. 30, 2021.

Co-pending U.S. Appl. No. 17/329,532, inventors Taylorroscoe; W. et al., filed May 25, 2021.

Co-pending U.S. Appl. No. 17/412,913, inventors Johnson; Peter L. et al., filed Aug. 26, 2021.

Co-pending U.S. Appl. No. 17/473,106, inventors Taylorroscoe; W. et al., filed Sep. 13, 2021.

Co-pending U.S. Appl. No. 17/487,982, inventors Hoermannalexander; F. et al., filed Sep. 28, 2021.

Co-pending U.S. Appl. No. 17/529,928, inventors Hardmanned; J. et al., filed Nov. 18, 2021.

Co-pending U.S. Appl. No. 17/741,161, inventors Heormann; Alexander F. et al., filed May 10, 2022.

Co-pending U.S. Appl. No. 17/862,242, inventors Hardman; Ned J. et al., filed Jul. 11, 2022.

Co-pending U.S. Appl. No. 18/066,929, inventor Alexander; F. Hoermann, filed Dec. 15, 2022.

Co-pending U.S. Appl. No. 18/172,835, inventor Ned; J. Hardman, filed Feb. 22, 2023.

Co-pending U.S. Appl. No. 18/233,129, inventors Alexander; F. Hoermann et al., filed Aug. 11, 2023.

(56) References Cited

OTHER PUBLICATIONS

Co-pending U.S. Appl. No. 18/381,881, inventors Hardman; Ned J. et al., filed Oct. 19, 2023.
Co-pending U.S. Appl. No. 18/384,704, inventors Johnson; Peter L. et al., filed Oct. 27, 2023.
Co-pending U.S. Appl. No. 18/433,023, inventors Johnson; Peter L. et al., filed Feb. 5, 2024.
Co-pending U.S. Appl. No. 18/614,492, inventors Alexander; F. Hoermann et al., filed Mar. 22, 2024.
Co-pending U.S. Appl. No. 18/651,160, inventors Roscoe; W. Taylor et al., filed Apr. 30, 2024.
Co-pending U.S. Appl. No. 18/658,443, inventors Hoermann; Alexander F. et al., filed May 8, 2024.
Co-pending U.S. Appl. No. 18/673,119, inventor Ned; J. Hardman, filed May 23, 2024.
Co-pending U.S. Appl. No. 18/680,456, inventors Ned; J. Hardman et al., filed May 31, 2024.
Co-pending U.S. Appl. No. 18/770,339, inventors Dames; Enoch E. et al., filed Jul. 11, 2024.
Co-pending U.S. Appl. No. 18/963,352, inventors Dames; Enoch Ee et al., filed Nov. 27, 2024.
Co-pending U.S. Appl. No. 19/051,990, filed Feb. 12, 2025.
Database WPI, Week 200323, 2017 Clarivate Analytics. Thomson Scientific, London, GB; Database accession No. 2003-239603, XP002781693.
Denka Black, available from Denki Kagaky Kogyo Kabushiki Kaisha, retrieved from the manufacturer's website on May 13, 2013.
Denka Black, available from Denki Kagaky Kogyo Kabushiki Kaisha, retrieved from the Wayback Machine archive of the manufacturer's website from Jul. 18, 2015.
Dick, J.S. Utilizing the RPA Variable Temperature Analysis for More Effective Tire Quality Assurance., conference paper/proceeding, International Tire Exhibition & Conference (ITEC), Akron, Ohio, Sep. 16-18, 2008: pp. 1-22.
Donnet, et al., Carbon Black. New York: Marcel Dekker, (1993): 46, 47 and 54.
Donnet, et al., Observation of Plasma-Treated Carbon Black Surfaces by Scanning Tunnelling Microscopy. Carbon (1994) 32(2): 199-206.
EP Application No. 21878297.7 Third Party Observation filed on Sep. 23, 2024.
EP15743214.7 Extended European Search Report dated Jan. 16, 2018.
EP15743214.7 Partial Supplementary European Search Report dated Sep. 12, 2017.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Erman, et al., The Science and Technology of Rubber. Fourth Edition, Academic Press (2013).
Extended European Search Report for EP Application No. 15742910.1 dated Jul. 18, 2017.
Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Frenklach, et al., Silicon carbide and the origin of interstellar carbon grains. Nature, vol. 339; May 18, 1989: 196-198.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al., A transmission electron microscope and electron diffraction study of carbon nanodisks. Carbon 46.12 (2008): 1535-1543.
Gomez-Pozuelo, et al., Hydrogen production by catalytic methane decomposition over rice husk derived silica. Fuel, Dec. 15, 2021; 306: 121697.
Grivei, et al., A clean process for carbon nanoparticles and hydrogen production from plasma hydrocarbon cracking. Publishable Report, European Commission JOULE III Programme, Project No. JOE3-CT97-0057, circa (2000): 1-25.
Hernandez, et al. Comparison of carbon nanotubes and nanodisks as percolative fillers in electrically conductive composites. Scripta Materialia 58 (2008) 69-72.
Hiemenz, P.C. Principles of Colloid and Surface Chemistry, 3rd ed., rev. and expanded, pp. 70-78 (1997).
Hoyer, et al., Microelectromechanical strain and pressure sensors based on electric field aligned carbon cone and carbon black particles in a silicone elastomer matrix. Journal of Applied Physics 112.9 (2012): 094324.
International Search Report and Written Opinion for Application No. PCT/US2015/013482 dated Jun. 17, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.
International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.

(56) References Cited

OTHER PUBLICATIONS

International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report and Written Opinion for Application No. PCT/US2024/32863 dated Oct. 9, 2024.
Knaapila, et al., Directed assembly of carbon nanocones into wires with an epoxy coating in thin films by a combination of electric field alignment and subsequent pyrolysis. Carbon 49.10 (2011): 3171-3178.
Kohlenstoff, 4., neubearbeitete und erweiterte Auflage, in Ullmanns Encyclopadie der technischen Chemie, p. 637 (1977).
KR Application No. 10-2023-7015313 Third Party Submission filed on Sep. 4, 2024.
Krishnan, et al., Graphitic cones and the nucleation of curved carbon surfaces. Nature 388.6641 (1997): 451-454.
Lahaye, J. et al., Morphology and Internal Structure of Soot and Carbon Blacks. In: Siegla, D.C., Smith, G.W. (eds) Particulate Carbon. Springer, Boston. (1981): 33-34.
Larouche, et al.,Nitrogen Functionalization of Carbon Black in a Thermo-Convective Plasma Reactor. Plasma Chem Plasma Process (2011) 31: 635-647.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
Long C. M., et al, "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
Medalia, et al., Tinting Strength of Carbon Black. Journal of Colloid and Interface Science 40.2. 1-21 (1972).
Naess, et al., Carbon nanocones: wall structure and morphology. Science and Technology of advanced materials (2009): 1-7.
Pawlyta, M. et al., Raman microspectroscopy characterization of carbon blacks: Spectral analysis and structural information, Carbon 84: 479-490 (2015).
PCT/US2015/013484 International Search Report and Written Opinion dated Apr. 22, 2015.
PCT/US2015/13487 International Search Report and Written Opinion dated Jun. 16, 2015.
PCT/US2015/13510 International Search Report and Written Opinion dated Apr. 22, 2015.
PCT/US2016/015941 International Search Report and Written Opinion dated Apr. 21, 2016.
PCT/US2018/028619 International Search Report and Written Opinion dated Aug. 9, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
PCT/US2021/053371 International Search Report and Written Opinion dated Feb. 17, 2022.
PCT/US2022/045451 International Search Report and Written Opinion dated Feb. 17, 2023.
PCT/US2023/010695 International Search Report and Written Opinion dated Jun. 22, 2023.
PCT/US2023/024148 International Search Report and Written Opinion dated Sep. 27, 2023.
PCT/US2023/077402 International Search Report and Written Opinion dated Apr. 7, 2024.
PCT/US2023/077479 International Search Report and Written Opinion dated Apr. 15, 2024.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Schmidt, H. 129Xe NMR spectroscopic studies on carbon and black graphite. Faculty of Natural Sciences of the University of Duisburg-Essen, (2003): 36 pages (German language document and machine translation in English).
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
Singh, M. et al., Effect of Fuel Composition on Carbon Black Formation Pathways, Appl. Sci. 12(2569): 1-16 (2022).
Structure, specifications and functions of various fillers [Data collection], Technical Information Institute, Aug. 29, 2008, pp. 34-38.
Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Toth, P., et al., Structure of carbon black continuously produced from biomass pyrolysis oil. Green Chem. (2018) vol. 20: 3981-3992.
Translation of Official Notification of RU Application No. 2016135213 dated Feb. 12, 2018.
Tsujikawa, et al., Analysis of a Gas Turbine and Steam Turbine Combined Cycle with Liquefied Hydrogen as Fuel. International Journal of Hydrogen Energy 7(6):499-505 (1982).
U.S. Appl. No. 16/657,386 Notice of Allowance dated May 20, 2022.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 1-474 pages.
U.S. Appl. No. 15/229,608 Office Action dated Jan. 23, 2024.
U.S. Appl. No. 15/548,346 Notice of Allowance dated Jan. 18, 2024.
U.S. Appl. No. 15/548,346 Notice of Allowance dated Jan. 30, 2024.
U.S. Appl. No. 16/802,174 Office Action dated Feb. 12, 2024.
U.S. Appl. No. 16/802,190 Office Action dated Jan. 31, 2022.
U.S. Appl. No. 17/498,693 Office Action dated Jan. 9, 2024.
U.S. Appl. No. 17/669,183 Office Action dated Jan. 5, 2024.
U.S. Appl. No. 17/817,482 Office Action dated Dec. 7, 2023.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Apr. 5, 2017.
U.S. Appl. No. 14/591,528 Office Action dated Jan. 16, 2018.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.

(56) References Cited

OTHER PUBLICATIONS

U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated mailed Aug. 3, 2016.
U.S. Appl. No. 14/610,299 Notice of Allowance dated Dec. 13, 2021.
U.S. Appl. No. 14/610,299 Notice of Allowance dated Feb. 20, 2020.
U.S. Appl. No. 14/610,299 Notice of Allowance dated Mar. 1, 2022.
U.S. Appl. No. 14/610,299 Notice of Allowance dated Nov. 16, 2021.
U.S. Appl. No. 14/610,299 Office Action dated Feb. 1, 2017.
U.S. Appl. No. 14/610,299 Office Action dated Feb. 17, 2021.
U.S. Appl. No. 14/610,299 Office Action dated Jun. 9, 2020.
U.S. Appl. No. 14/610,299 Office Action dated Jun. 17, 2019.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 4, 2022.
U.S. Appl. No. 15/229,608 Office Action dated Apr. 8, 2019.
U.S. Appl. No. 15/229,608 Office Action dated Feb. 1, 2021.
U.S. Appl. No. 15/229,608 Office Action dated Jun. 29, 2023.
U.S. Appl. No. 15/229,608 Office Action dated May 15, 2020.
U.S. Appl. No. 15/229,608 Office Action dated Nov. 28, 2022.
U.S. Appl. No. 15/229,608 Office Action dated Oct. 25, 2019.
U.S. Appl. No. 15/229,608 Restriction Requirement dated Jul. 30, 2018.
U.S. Appl. No. 15/241,771 Notice of Allowance dated Nov. 20, 2023.
U.S. Appl. No. 15/241,771 Office Action dated Dec. 16, 2022.
U.S. Appl. No. 15/241,771 Office Action dated Dec. 30, 2021.
U.S. Appl. No. 15/241,771 Office Action dated Jan. 18, 2023.
U.S. Appl. No. 15/241,771 Office Action dated Jul. 18, 2022.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Nov. 15, 2017.
U.S. Appl. No. 15/241,771 Office Action dated Sep. 1, 2023.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated Jun. 18, 2021.
U.S. Appl. No. 15/259,884 Office Action dated Mar. 4, 2022.
U.S. Appl. No. 15/259,884 Office Action dated May 31, 2019.
U.S. Appl. No. 15/259,884 Office Action dated Oct. 11, 2018.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jul. 31, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,346 Office Action dated Jul. 16, 2021.
U.S. Appl. No. 15/548,346 Office Action dated Jun. 5, 2023.
U.S. Appl. No. 15/548,346 Office Action dated Mar. 14, 2019.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 22, 2019.
U.S. Appl. No. 15/548,346 Office Action dated Oct. 3, 2022.
U.S. Appl. No. 15/548,348 Notice of Allowance dated Dec. 12, 2019.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/159,144 Office Action dated Mar. 26, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Notice of Allowance dated Nov. 18, 2021.
U.S. Appl. No. 16/180,635 Office Action dated Dec. 15, 2020.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/445,727 Office Action dated Apr. 15, 2022.
U.S. Appl. No. 16/445,727 Office Action dated Aug. 17, 2021.
U.S. Appl. No. 16/563,008 Notice of Allowance Dated Nov. 6, 2023.
U.S. Appl. No. 16/563,008 Office Action dated Dec. 13, 2021.
U.S. Appl. No. 16/563,008 Office Action dated Jul. 25, 2022.
U.S. Appl. No. 16/563,008 Office Action dated Mar. 16, 2023.
U.S. Appl. No. 16/657,386 Notice of Allowance dated Mar. 10, 2023.
U.S. Appl. No. 16/657,386 Office Action dated Nov. 12, 2021.
U.S. Appl. No. 16/657,386 Office Action dated Sep. 16, 2022.
U.S. Appl. No. 16/802,174 Office Action dated Aug. 31, 2022.
U.S. Appl. No. 16/802,174 Office Action dated Feb. 16, 2022.
U.S. Appl. No. 16/802,174 Office Action dated Oct. 4, 2023.
U.S. Appl. No. 16/802,190 Notice of Allowance dated Feb. 26, 2024.
U.S. Appl. No. 16/802,190 Notice of Allowance dated Mar. 12, 2024.
U.S. Appl. No. 16/802,190 Office Action dated Apr. 19, 2023.
U.S. Appl. No. 16/802,190 Office Action dated Nov. 17, 2023.
U.S. Appl. No. 16/802,190 Office Action dated Oct. 5, 2022.
U.S. Appl. No. 16/802,212 Office Action dated Jul. 17, 2023.
U.S. Appl. No. 16/802,212 Office Action dated Mar. 24, 2022.
U.S. Appl. No. 16/802,212 Office Action dated Mar. 25, 2024.
U.S. Appl. No. 16/802,212 Office Action dated Sep. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Notice of Allowance dated Jan. 23, 2023.
U.S. Appl. No. 16/892,199 Notice of Allowance dated Jan. 31, 2023.

(56) References Cited

OTHER PUBLICATIONS

U.S. Appl. No. 16/892,199 Notice of Allowance dated May 4, 2023.
U.S. Appl. No. 16/892,199 Office Action dated Jun. 27, 2022.
U.S. Appl. No. 17/062,075 Office Action dated Jun. 14, 2023.
U.S. Appl. No. 17/498,693 Office Action dated Apr. 3, 2023.
U.S. Appl. No. 17/565,864 Notice of Allowance dated Feb. 1, 2024.
U.S. Appl. No. 17/565,864 Office Action dated Aug. 15, 2023.
U.S. Appl. No. 17/669,183 Notice of Allowance dated Aug. 26, 2024.
U.S. Appl. No. 17/669,183 Office Action dated Aug. 23, 2023.
U.S. Appl. No. 17/817,482 Notice of Allowance dated Jul. 31, 2024.
U.S. Appl. No. 17/817,482 Office Action dated Mar. 29, 2023.
U.S. Appl. No. 17/819,075 Office Action dated Apr. 9, 2024.
U.S. Appl. No. 17/819,075 Office Action dated Oct. 5, 2023.
U.S. Appl. No. 17/819,075 Office Action dated Sep. 5, 2024.
U.S. Appl. No. 17/938,304 Office Action dated Feb. 6, 2025.
U.S. Appl. No. 17/938,304 Office Action dated May 21, 2024.
U.S. Appl. No. 17/938,591 Notice of Allowance dated Feb. 9, 2024.
U.S. Appl. No. 17/938,591 Office Action dated Sep. 25, 2023.
U.S. Appl. No. 18/046,723 Notice of Allowance dated Apr. 12, 2023.
U.S. Appl. No. 18/046,723 Notice of Allowance dated Apr. 19, 2023.
U.S. Appl. No. 18/046,723 Notice of Allowance dated Aug. 7, 2023.
U.S. Appl. No. 18/046,723 Notice of Allowance dated Oct. 18, 2023.
U.S. Appl. No. 18/137,918 Notice of Allowance dated Dec. 2, 2024.
U.S. Appl. No. 18/137,918 Office Action dated Nov. 17, 2023.
U.S. Appl. No. 18/205,384 Third Party Submission filed Sep. 24, 2024.
U.S. Appl. No. 18/638,484 Office Action dated Nov. 13, 2024.
U.S. Appl. No. 18/736,457 Office Action dated Feb. 12, 2025.
Vanooij W. et al., Adhesion of Steel Tire Cord to Rubber, Rubber Chemistry and Technology 82: 315-339 (2009).
Verfondern, Nuclear Energy for Hydrogen Production. Schriften des Forschungzentrum Julich 58 (2007): 4 pages.
What is Carbon Black, Orion Engineered Carbons, pp. 1-48 (Year: 2015).
Wikipedia. File: Diagram of carbon black structure and texture creation.png. 1-3 (May 8, 2024). https://en.wikipedia.org/wiki/File:Diagram_of_carbon_black_structure_and_texture_creation.png.
Wikipedia, Heating Element. Oct. 14, 2016. p. 1 para[0001]. Retrieved from https://en.wikipedia.org/w/index.php?title=Heating_element&oldid=744277540 on May 9, 2018.
Wikipedia, Joule Heating. Jan. 15, 2017. p. 1 para[0002]. Retrieved from https://en.wikipedia.org/w/index . Dhp?title=Joule_heating&oldid=760136650 on May 9, 2018.
Wikipedia. Radiocarbon method. 1-17 (May 8, 2024). https://dewikipedia.org/wiki/Radiokarbonmethode. (German language document and machine translation in English).
Wissler ("Graphite and carbon powders for electrochemical applications", J Power Sources, 156 (2006) 142-150). (Year: 2006).
Zhang, H. et al., Rotating gliding arc assisted methane decomposition in nitrogen for hydrogen production, Intern. J. Hydrogen Energy, 2014, 39, pp. 12620-12635 (Jul. 11, 2014).

\* cited by examiner

METHOD OF MAKING CARBON BLACK

TECHNICAL FIELD

The field of art to which this invention generally pertains is methods for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

A method of making carbon black in a plasma process is described, including subjecting the carbon black particles during and/or after formation to surface functionalizing agents in a controlled manner so as to impart a degree and/or density of functionalization onto the carbon black particles so as to adapt the particles to a particular pre-intended application.

Additional embodiments include: the method described above where the functional groups comprise oxygen containing functional groups; the method described above where the functional groups are introduced in the reactor, pelletizer, and/or dryer; the method described above where the functional groups comprise carboxylic acid and/or phenolic groups; the method described above where the density of the functionalization is up to about 30 micromol/m$^2$; the method described above where the carbon black particles are subjected to the functionalizing agents at temperatures up to about 500° C.; the method described above where the functionalizing agents contain one or more oxidizing agents; the method described above where the functionalizing agents contain one or more of $H_2$, CO, $CO_2$, $O_2$, water vapor, nitrogen, $N_2O$, $NO_2$, ozone, ammonia, amines, methyl amines, hydroxides, $H_2O_2$, acids, $HNO_3$, persulfates, hypohalites, halites, halates, perhalates, permanganates, carbonates, bleach, nitric acid, potassium permanganate, sulfuric acid, diazonium salts, diazonium salt of sulfanilic acid, nitrates, nitrate salts, organic nitrates, peroxides, and alkali metal super peroxides; and the carbon black produced by the process described above.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Carbon blacks (CB) made with a particular surface chemistry can impart improved performance in rubber, composite, and other applications. Typically carbon black produced by plasma and other high temperature processes have performed poorly in rubber compounds in the past. However, when surface functionality can be controlled, carbon blacks with superior performance properties when compared to traditionally produced plasma blacks can be produced, e.g., even out performing some typical oil based furnace blacks.

The performance can be improved, for example, through the creation of oxygen functional groups at the carbon surface. In the typical furnace process, functional groups can inherently exist at the surface, for example, due to the existence of a time-temperature profile that can be characterized as having the CB in contact with tail gas composed of water, hydrogen, carbon monoxide, carbon dioxide and various other gases. These gases can be in intimate contact with the CB while the CB is still at high temperature (e.g., about 600° C.) which can enable the formation of surface functional groups. Due to the lack of oxygen groups in the tail gas in a typical plasma process, surface functional groups will typically not form, and the material can have what is known as "dead surface". This dead surface can be characterized as not having a substantial amount of water uptake when exposed to a range of relative humidity (RH) conditions (for example, from about 0% to about 80% RH).

Controlled oxidation can place specific groups at the surface. For instance, the surface of furnace black might be comprised of 60:40 (mole equivalents) phenolic:carboxylic acid groups whereas with a controlled surface the ration could be comprised of 10:90 phenolic:carboxylic acid groups. The carboxylic acid groups will typically be more reactive to rubber or SBR (styrene butadiene rubber) and more likely to form what is known as "bound rubber". A larger amount of bound rubber could result in lower vibration, hysteresis, treadwear, and/or higher reinforcement, in addition to other possible benefits such as increased vehicle miles per gallon (mpg).

What is disclosed herein, is the control of the surface chemistry of the CB by improving such things as the reactor mixing, pelletizer additives and oxidation of the surface in the dryer through the introduction of air or other oxidizers to contact the product at temperature. Adding oxidizers to the reactor gasses could produce similar improvements and represent a part of what is described herein. Modification of the surface chemistry by changing the mixing so that the same surface area product forms at a different temperature; modifying the surface chemistry of the product by the use of additives to the pelletizer; modifying the surface chemistry of the product by the use of changing the gas phase chemistry in the dryer, and modifying the surface chemistry by changing the gas phase chemistry in the reactor and/or heat exchanger and/or degas vessel, are all included herein.

Due to the combination of time-temperature profile and the atmosphere at such a time-temperature reaction, oxygen groups typically form at the surface of carbon black when made utilizing the traditional furnace process. The typical atmosphere or tail gas of a furnace reactor that burns oil and possesses a water quench can comprise the following components (according to Donnet's *Carbon Black*, $2^{nd}$ Edition, pub. by Marcel Dekker, 1993, the disclosure of which is herein incorporated by reference (at page 46)).

TABLE 1

| Tail Gas Component | Volume Percent |
|---|---|
| $N_2$ | 61-67 |
| $CO_2$ | 3-5 |
| CO | 11-15 |
| $H_2$ | 12-24 |
| $CH_4$ | 0.02-0.5 |
| $C_2H_4$ | 002-0.5 |

In addition to these components, water vapor is typically present at about 35%-45%. Elevated temperatures in air can cause the surface oxidation of carbon black where the temperatures can be as low as about 250° C.-400° C. (Carbon Black, Donnet, p. 47). For the plasma black process with hydrogen quench, ideally there is zero oxygen present. This means that there will typically be no surface oxygen functional groups in the final product. There are many applications that benefit from having these oxygen function groups at the surface. In this way, the furnace black process can appear to have some advantage over a plasma black process. However, because the functional groups at the surface of a furnace black are there by happenstance, this material may not be fully optimized for any particular application. However, as described herein, with the plasma black process the option exits to fine tune the surface chemistry of the black to the exact parameters of the desired application. For the operators of the furnace black process to take advantage of this process, they would have to either surface modify the current non-ideal particles or heat treat (to the point of full oxygen removal) to start with a non-oxygenated surface and then treat with reactive moieties to obtain the more optimized surface.

EXAMPLE 1

The following equilibrium is established (in the furnace black process), wherein the rate constant increases with increasing temperature. The pressure of the environment is also important. In a vacuum or atmosphere where continuous gas flow over the surface is present, the right-hand side of equation 1 will be heavily favored. For a pressurized system the left hand side of equation 1 will be favored. CO and $CO_2$ are released from the surface at lower temperatures (about 250° C.-400° C.) and hydrogen is released at higher temperatures (about 800° C. and greater) where graphitization is taking place.

Equation 1. Equilibrium Equation for Formation of Surface Groups on CB.

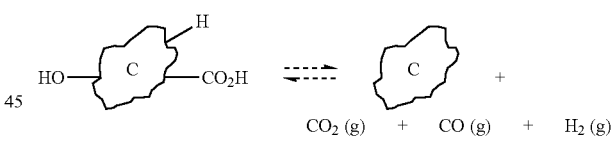

Again, if there is a flowing stream of inert gas or vacuum present, then the right hand side of equation 1 is favored and this can result in some amount of mass loss. Under pressure and in the correct atmosphere, the left hand side of equation 1 will be favored. Preferably the pressurization of the vessel would involve raising the vessel to greater than atmospheric pressure but typically less than 10 bar.

The mixture of functional groups at the CB surface from the furnace process is simply the product as it is made. In that regard it is truly an uncontrolled, unoptimized product. The tailoring of the groups is just simple not easily doable with the furnace process. With the process described herein, it is possible to tailor the surface of the CB to the specific application. It is further possible to tailor the performance of the CB within the application. For example, if carboxylic acid groups increase the bound rubber content in SBR polymer composites, then the ability to control the surface characteristics of the CB could allow for the tuning of the amount of bound rubber and thus fine tune or reduce the amount of road noise, vibration, or even improve the in mpg of the tire based upon this improved quality.

In the above example, the functional surface groups at the CB surface could be 50/50 carboxylic acid and phenolic as made similar to what is produced in a conventional furnace process, while the process described herein could allow for tailoring of the surface functional groups at 90:10, 80:20, 70:30. 60:40, 50:50. 40:60. 30:70. 20:80. or 10:90, for example. This does not exclude the possibility of even much more detailed tuning of the surface groups. Some, or even most, of these types of composites would not be accessible through furnace black, gas black, lamp black, thermal black, etc. technology. A more detailed surface composition could comprise epoxy, quinone, carboxylic acid, phenol, ether, anhydride, carbonyl, lactone, among other reactive groups at for instance a ratio of 5:5:35:30:10:5:5:5, for example.

In addition to controlling the ratio of the surface composition, there is the additional dimension of the amount or density of surface functional groups on the CB. For instance the amount of functional groups on a typical furnace black could be one micromol/meter (m) 2. While this has been used in the tire industry in the past, this is simply the amount that is obtained in a typically furnace black process. Through tuning the chemistry, pressure and temperature of the process described herein, a range of densities, for example, anywhere from 0 to 30 micromol/m$^2$ can be obtained. This fine tuning capability can allow for the direct control of the interfacial surface energy between the rubber and particle and also allows for optimal bonding between these materials. It can similarly tailor surface chemistry for superior performance in other applications, reducing viscosity build in inks, improving dispersability in paints, superior color development in masterbatches, and perhaps improved conductivity in plastics through superior dispersion. In each application, the chemistry can be tailored not just to an application, but to each compound or vehicle (liquid system) used within an application.

Because the traditional furnace process doesn't allow for the control of these parameters, it could be advantageous to take a furnace black and treat the surface in the same fashion as the plasma blacks made by a typical plasma process, or any of the above techniques. Increasing the density of functional groups and changing the ratio of the groups present (through increasing the density) can improve the performance of traditional furnace and other process blacks. In this regard the furnace black can be better tuned for the final application.

EXAMPLE 2

Three exemplary methods which can be used to treat the CB surfaces as described herein, can include, for example, the use of: 1-high temperatures and weak reagents; 2-low temperatures and strong reagents; 3-high temperatures and strong reagents. For the first situation, the CB can be preheated and then doused with gas and steam. The CB could be at room temperature or up to 400° C. when doused with reagent gases. A list of less reactive gases is given below: $H_2$, CO, $CO_2$, $O_2$, water vapor. Nitrogen can also be present simply to control the amount of dousing. More reactive gases are listed below: $N_2O$, $NO_2$, ozone, ammonia, methyl amines, other general amines.

More reactive ingredients for the functionalization of the surface can include peroxides such as $H_2O_2$, acids such as $HNO_3$, persulfates, hypohalites, halites, halates, or perhalates, permanganates, bleach, which is a hypohalite, is a low-cost example of one of these reagents. Combinations of these reagents can yield especially strong reaction conditions, for example, nitric acid in combination with hydrogen peroxide or potassium permanganate with sulfuric acid.

Included in the stronger reagents family are any diazonium salt-based methods. For instance, it may be advantageous to react the diazonium salt of sulfanilic acid with the CB surface in order to obtain sulfonate functionality. One skilled in this art could see how this general diazonium based strategy could be used to corporate a wide variety of functional groups at the surface. One advantage over the furnace black process is that the surface tuned by the methods described herein could have only the desired functionality and would not possess the inherent byproducts of the furnace process (e.g., random, uncontrolled deposition of oxygen groups at the surface).

EXAMPLE 3

Any combination of the above could be used to design the optimum particle surface. One of the methods to treat the surface could be to treat in a pressurized vessel to optimize the results based on equation 1. Another method could be to add the reagents to the pelletizer and then dry at moderate temperatures (about 150° C.-250° C.). The latter method would be more amenable to stronger reagents listed above. However, small amounts of strong reagents in a pressurized vessel might also be employed. Optionally, the hydrogen from the degas step can be partially removed and the hydrogen in the pores remain. To this partially degassed CB, air can be added in such a way as to avoid explosive combinations of hydrogen and oxygen. Upon diffusion of oxygen into the pores of the CB and while the temperature is being elevated, the reaction of $H_2$ and $O_2$ can be facilitated in such a way as to provide localized heat to the CB surface. This could further enable reaction to take place to form oxygenated surface functional groups.

EXAMPLE 4

For even greater control of the reaction at the surface, it might be desirable to douse the reactor, allow for diffusion of gaseous molecules/reagents and then raise the temperature or add a catalyst. The diffusion could be aided through the pressurization of the system. An example could be the following: 1-degas $H_2$ out of the system utilizing $N_2$; 2-replace $N_2$ with 50/50 $CO/H_2O$; 3-system is inherently at about 250° C.; 4-allow for diffusion to occur at pressure (up to 10 min.); 5-ramp temperature to about 500° C. If heat transfer from pressurized reactor walls is slow, then alternative designs can be considered that would minimize the amount of space between reactor walls and the center of the CB mass. Another alternative in the case of slow diffusion of heat is to add a substance (reactive A) that will absorb to the surface of the CB followed by a second step of adding reactive B that will react exothermically with reactant A to provide a temperature activated surface and the final reactant. An example of this could be $H_2$ and $O_2$ to form $H_2O$ at between about 400° C. and 500° C. $H_2O$ would then proceed to react with the CB surface and provide oxygen functionality, or an intermediate between elemental hydrogen plus oxygen and the resulting water can react, e.g., an OH radical.

The water spreading pressure (WSP) referred to below is taken from U.S. Pat. No. 8,501,148, the disclosure of which is herein incorporated by reference. Briefly, the mass increase is measured in a controlled atmosphere where the relative humidity is increased slowly over time. The increase is from 0 to 80% relative humidity and the WSP ($\pi^e$) is determined as the following equation:

Equation 2. Equation for Calculating WSP ($\pi^e$).

$$\pi^e = (RT/A) \int_0^{Po} H_2O(moles/g) d \ln P$$

Where R is the gas constant, T is the temperature, A is the $N_2$ surface area (SA) (ASTM D6556) of the sample and $H_2O$ is the amount of water adsorbed to the carbon surface at the various RH's. P is the partial pressure of water in the atmosphere and Po is the saturation pressure and g is gram. The equilibrium adsorption is measured at various discrete RH's and then the area under the curve is measured to yield the WSP value. Samples are measured at 25° C. using the 3Flex system from Micromeritics. The region being integrated is from 0 to saturation pressure. The d has its normal indication of integrating at whatever incremental unit is after the d, i.e., integrating at changing natural log of pressure.

Another method to obtain information as to the functionality at the surface is to perform titrations as documented by Boehm (Boehm, HP "Some Aspects of Surface Chemistry of Carbon Blacks and Other Carbons." Carbon 1994, page 759), the disclosure of which is incorporated herein by reference. WSP is a good parameter to measure general hydrophilicity of CB, however WSP does not provide for the ratio of functional groups at the surface as can be measured through typical TPD, XPS, or other typical titration methods (Boehm).

The process described herein is an in situ (in reactor) method of tuning the surface chemistry of CB to form ideal particles for the intended application. The method itself can also be employed outside of the reactor, however, optimal efficiencies, e.g., such as cost savings, can be obtained within the reactor. Dimensions such as WSP and density of groups at the surface are controlled. The ratios of the functional groups and the WSP tunability are of particular importance as this will enable performance in key applications such as the tire and rubber industry, among others. The implications are across all market segments which can be a crucial dimension in application performance.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of forming a functionalized carbon particle, comprising:
    (a) in a thermal plasma process reactor, forming a carbon particle in an atmosphere comprising hydrogen and substantially free of oxygen, wherein the carbon particle is substantially free of surface oxygen functional groups; and
    (b) in the thermal plasma process reactor, subjecting the carbon particle to a functionalization agent, thereby functionalizing a surface of the carbon particle to generate a functionalized carbon particle, wherein the subjecting is performed in a controlled manner.

2. The method of claim 1, wherein the carbon particle is subjected to the functionalization agent at a temperature of at most about 500° C.

3. The method of claim 1, wherein the carbon particle is carbon black.

4. The method of claim 1, wherein the functionalization agent is selected from the group consisting of one or more of hydrogen ($H_2$), carbon monoxide (CO), carbon dioxide ($CO_2$), oxygen ($O_2$), water vapor, nitrogen, nitrous oxide ($N_2O$), nitrogen dioxide ($NO_2$), ozone, ammonia, amines, methyl amines, hydroxides, peroxides, hydrogen peroxide ($H_2O_2$), alkali metal super peroxides, acids, nitric acid ($HNO_3$), sulfuric acid ($H_2SO_4$), persulfates, hypohalites, halites, halates, perhalates, permanganates, potassium permanganate, carbonates, bleach, diazonium salts, diazonium salt of sulfanilic acid, nitrates, nitrate salts, organic nitrates, or any combination thereof.

5. The method of claim 4, wherein the functionalization agent is selected from the group consisting of nitric acid, diazonium salts, or any combination thereof.

6. The method of claim 5, wherein the functionalization agent is nitric acid and a diazonium salt.

7. The method of claim 1, wherein the functionalized carbon particle comprises oxygen containing functional groups.

8. The method of claim 1, wherein the functionalized carbon particle comprises carboxylic acid groups.

9. The method of claim 1, wherein the functionalized carbon particle comprises phenolic groups.

10. The method of claim 1, wherein a surface of the functionalized carbon particle comprises functionalization of at most about 30 micromoles/square meter (μmol/m2).

11. The method of claim 1, wherein the functionalization agent comprises one or more oxidizing agents.

12. The method of claim 1, wherein the functionalization agent is a gas phase functionalization agent.

13. The method of claim 1, wherein the functionalization agent is a liquid phase functionalization agent.

* * * * *